Jan. 17, 1967           D. L. WILLIAMS           3,299,351
APPARATUS FOR DETECTING FAULTS IN BURIED CABLES INCLUDING
MEANS FOR APPLYING A COMPOSITE SIGNAL HAVING FUNDAMENTAL
AND EVEN HARMONIC FREQUENCY COMPONENTS
Filed March 27, 1964           3 Sheets-Sheet 1

INVENTOR
Dewi L. WILLIAMS

Curphey & Erickson

AGENT

INVENTOR
Dewi L. WILLIAMS

INVENTOR
Dewi L. WILLIAMS

Curphey & Erickson
AGENT

United States Patent Office 3,299,351
Patented Jan. 17, 1967

3,299,351
APPARATUS FOR DETECTING FAULTS IN BURIED CABLES INCLUDING MEANS FOR APPLYING A COMPOSITE SIGNAL HAVING FUNDAMENTAL AND EVEN HARMONIC FREQUENCY COMPONENTS
Dewi L. Williams, Chateaugay Centre, Quebec, Canada, assignor to Northern Electric Company, Limited, Montreal, Quebec, Canada
Filed Mar. 27, 1964, Ser. No. 355,216
7 Claims. (Cl. 324—52)

This invention relates to the detection of the polarity of a known signal and the application thereof to detecting faults in cables buried in a conducting medium, which faults cause leakage from an inner metallic sheath of the cable to the medium.

Many types of cables now in use for burial in the ground (or submersion under water) have a metallic sheath, such as aluminum or steel among the layers of covering material. This sheath is itself covered by a further layer of insulating material, such as polyethylene or polyvinyl chloride. This outer layer of insulating material sometimes develops small cracks often due to maltreatment of the cable. Moisture from the surrounding medium can enter the cable through these cracks in the covering. The first effect of this is to produce a high resistance current leakage between the sheath and the medium. This is not usually severe enough to necessitate taking the cable out of service. However, if no action is taken to repair the fault enough moisture may eventually enter the cable and cause complete breakdown.

One form of apparatus now in use for finding such faults comprises a D.C. generator having its terminals connected between the inner metallic cable sheath and ground. At the fault, the signal current from the generator enters the ground and may be picked up by a detector connected to two probes driven into the ground. By moving the probes along the line of the cable the exact location of the fault can be located. As the two probes are advanced towards the point of highest potential, which is at the fault, the leading probe is at a higher potential than the other. Once the probes have passed the fault, the leading probe is at a lower potential than the other. Thus, the polarity of the signal picked up by the probes changes at the fault and thereby indicates the location of the fault.

This type of apparatus, however, is not very sensitive and a better instrument is definitely required when trying to locate a high-resistance fault or when trying to locate a fault in an area where there are large stray currents.

An attempt has been made to overcome the drawbacks of the above described apparatus by using a low frequency pulsing generator (6 cycles per minute) in place of the D.C. generator. However, frequencies of this low magnitude necessitate direct-coupled amplifiers in the detector circuit. Such amplifiers are noisy, unstable and temperature sensitive.

It is therefore an object of this invention to provide an improved apparatus for locating high resistance faults and for locating such faults in an area where there are large stray currents.

The foregoing object is achieved by applying to the metallic sheath of the cable under test an A.C. signal containing a fundamental frequency component and an even harmonic component of the fundamental frequency. Such a signal is not identical to the original signal when inverted and therefore has a polarity. A potential due to the composite signal flowing into the ground at the fault location is picked up by two probes at spaced locations longitudinally of the cable. The detected signal is separated by means of tuned circuits into its fundamental and even harmonic components. The separated fundamental frequency is then converted to a frequency equal to the separated even harmonic frequencies and the phase relationship between the converted frequency and the detected even harmonic frequency is compared. A change in phase relationship is indicative of a change in the polarity of the signal picked up by the probes as they are moved past the fault and thereby is an indication of the location of the fault.

The use of an A.C. signal permits the use of tuned circuits in the detector apparatus. This makes the detector insensitive to stray signals of other frequencies flowing into the ground and thus overcomes one of the drawbacks of the prior art system. Furthermore, tuned amplifiers are less noisy, more stable and less sensitive to temperature than D.C. amplifiers.

The invention may be better understood by referring to the accompanying drawings in which.

Figure 1:
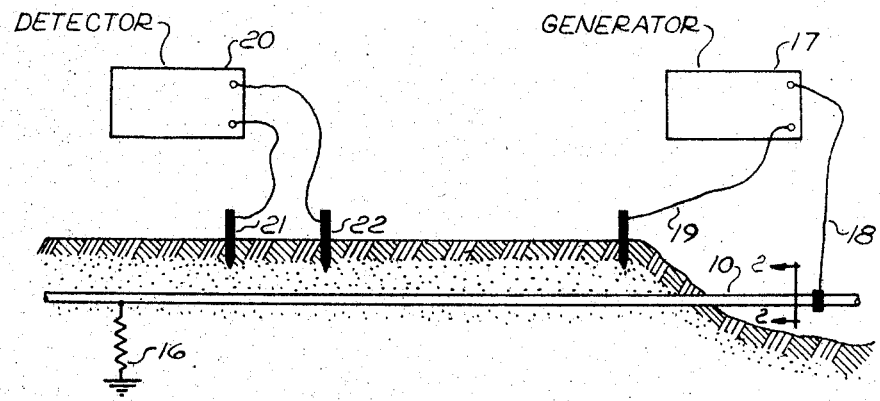
FIGURE 1 is a diagrammatic view of a generator and a detector in accordance with the present invention shown in relation to a faulty cable.
Figure 2:
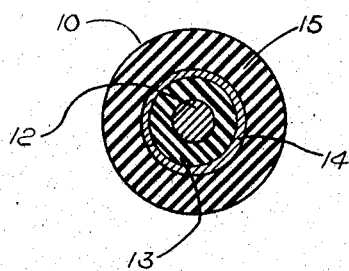
FIGURE 2 is a sectional view of the cable under test.

Referring to FIGURES 1 and 2 of the drawings, a cable 10 is shown buried in the ground 11. The cable has a central conducting portion 12, which may be a single solid conductor, or a plurality of individually insulated conductors, covered with a layer of insulating material 13. Disposed over this layer is a metallic shealth 14 which is in turn covered with a layer of insulating material 15. A fault in the cable due to the moisture which has entered a crack in the insulating material is represented by a resistance 16 between the inner metallic sheath 14 and ground 11.

Figure 4:
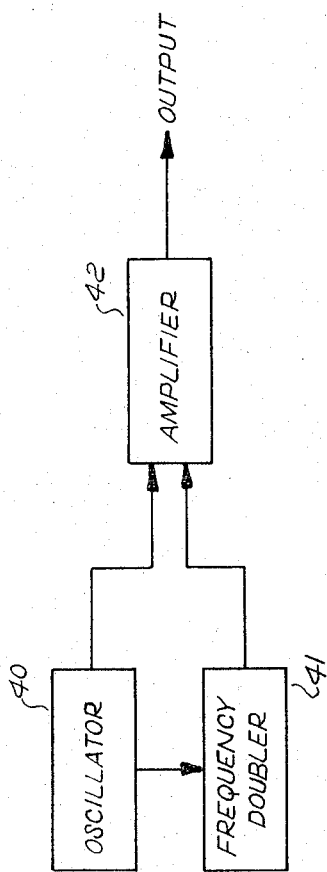
FIGURE 4 illustrates a generator for the composite signal of FIGURE 3.
Figure 5:
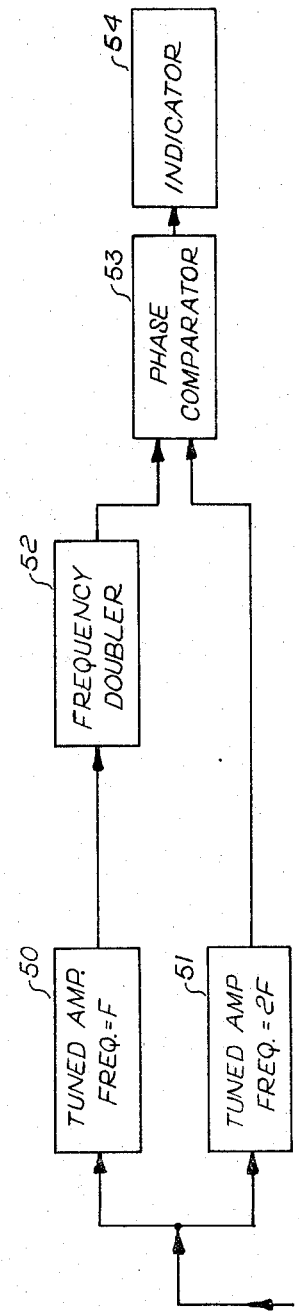
FIGURE 5 is a block diagram illustrating a detector according to the invention.

A signal generator 17 of the type described later in FIGURE 4 is connected to the inner metallic sheath 14 of cable 10 by a lead 18 and to ground by lead 19 for applying a signal according to the invention to the metallic sheath. A detector apparatus 20, which is described hereinafter with respect to FIGURE 5, is provided with two probes 21 and 22 for detecting the above signal as it passes from the metallic sheath 14 to ground through the crack in the insulating layer at 16.

Figure 3:
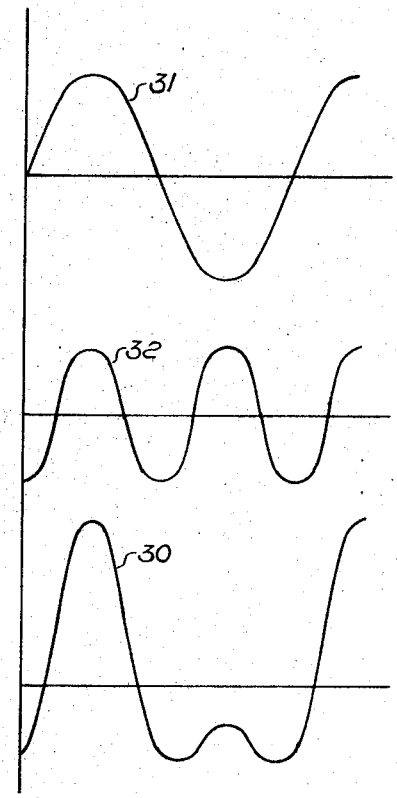
FIGURE 3 illustrates the make up of a composite test signal according to the invention.

FIGURE 3 shows the make-up of the signal applied to the metallic sheath by the generator 17. The signal 30 is the summation of a signal 31 of frequency $f$ and a signal 32 of frequency 2f generally referred to as the fundamental and second harmonic, respectively. It can be seen that the waveform of signal 30 is non-symmetrical with respect to the time axis and therefore has a polarity. Although the applicant has shown a composite signal consisting of a fundamental plus the second harmonic of the fundamental, it is understood that any even harmonic of the fundamental can be used.

The fundamental frequency $f$ must be sufficiently removed from the frequency of the local power lines and any harmonic thereof to preclude interference with detection of the signal. The usual power line frequency in North America is 60 c.p.s. and it has been found that 83 c.p.s. is a particularly suitable frequency for the test signal under these conditions.

FIGURE 4 illustrates a generator suitable for producing the composite signal 30 of FIGURE 3. An oscillator 40 is connected to a frequency doubler 41. An amplifier 42 adds the outputs of oscillator 40 and frequency doubler 41 to produce signal 30.

The detector 20 of FIGURE 1 is shown diagrammatically in FIGURE 5 of the drawings. This figure shows a connection from the probes 21 and 22 of FIGURE 1 to tuned amplifiers 50 and 51. Amplifier 50 is connected to frequency doubler 52. The outputs of frequency doubler 52 and amplifier 51 are connected to phase comparator 53 which is in turn connected to indicator 54.

Figure 6:
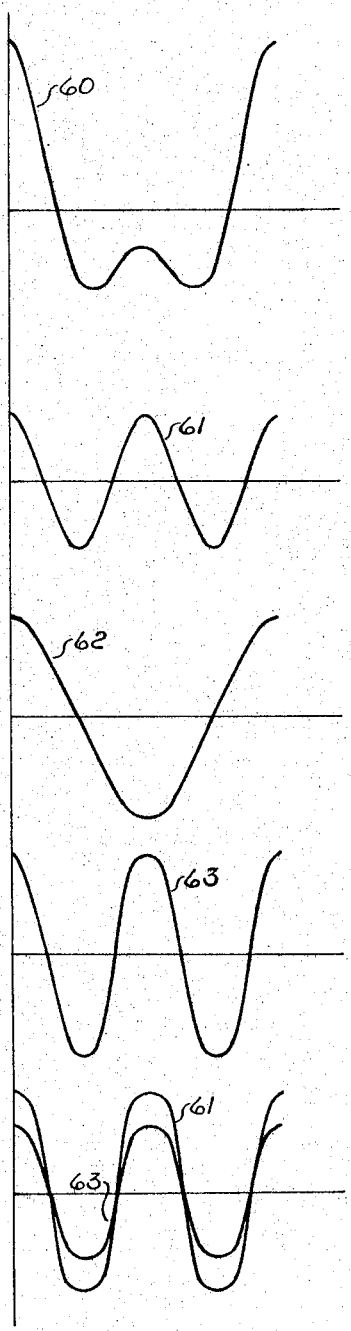
FIGURE 6 illustrates waveforms at various points within the detector of FIGURE 4.

The operation of the detector of FIGURE 5 will now be described with reference to FIGURE 6 which illustrates the waveforms at various points in the detector for a given polarity of the signal detected by probes 21 and 22. The signal 60 is the difference in potential of the original signal 30 at the probes. This signal is resolved into its constituent waveforms 61 and 62 by tuned circuits 50 and 51. The output of frequency doubler 52 is illustrated by waveform 63. Waveforms 61 and 63 are then compared by frequency comparator 53 and are shown as being in phase in the lower part of FIGURE 6.

Figure 7:
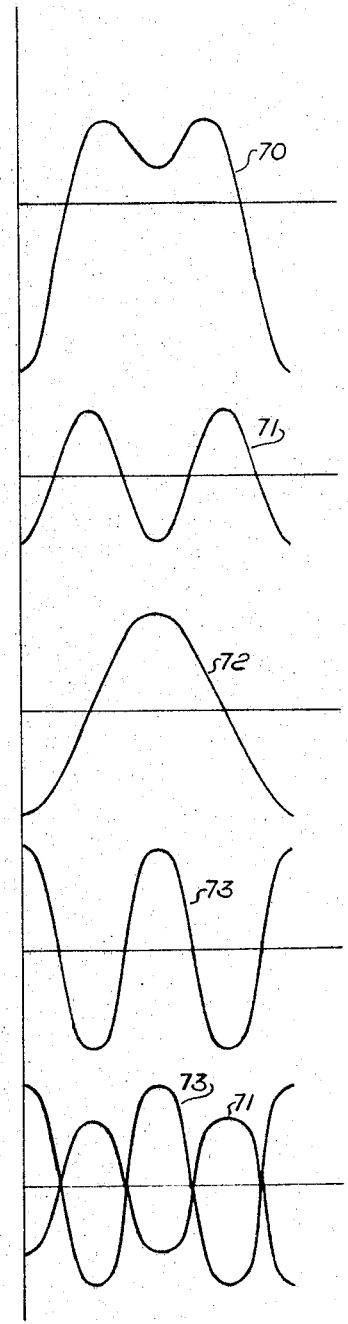
FIGURE 7 illustrates waveforms corresponding to those of FIGURE 6 for a detected signal of the opposite polarity.

Assuming that signal 60 represents the signal picked up by probes 21 and 22 as they approach the fault, signal 70 of FIGURE 7 would then represent the signal picked up by the probes as they are moved beyond the fault in their original order. It can be seen that waveform 70 is inverted with respect to waveform 60. This is because as the probes 21 and 22 are advanced towards the point of highest potential, which is at the fault, the leading probe is at a higher potential than the other. Once the probes 21 and 22 have passed the fault, the leading probe is at a lower potential than the other. Thus, the polarity of the signal picked up by the probes change polarity at the location of the fault. Following the same process as signal 60, signal 70 will also be resolved into its waveforms 71 and 72. Waveforms 73 illustrates the output of frequency doubler 52. It can be seen from the lower part of FIGURE 7 that waveforms 73 and 71 when compared by phase comparator 53 appear as being out of phase.

The indicator 54 could be a pair of lamps, one of which is arranged to light when the waveforms are in phase (FIGURE 6) and the other lighting when the waveforms are out of phase (FIGURE 7). When using the equipment, the operator advances along the line of the cable as long as one lamp is lit. When the other lamp comes on, he knows he has gone too far and back-tracks until he finds a point where neither lamp is on. This location of the probes is then indicative of the location of the fault.

The indicator 54 could also be a meter having a mid-scale zero indication.

It is also understood that the detector will be able to detect the polarity of any signal containing a fundamental frequency component and the second harmonic frequency of said fundamental. For example the polarity of an asymmetrical square wave could be detected. It can be shown by mathematical analysis that such a waveform is made up mainly of a fundamental plus second and third harmonics, plus smaller amounts of higher harmonics. Since the detector is tuned to the fundamental and second harmonic, it will operate just as well with the square wave as with the waveform of FIGURE 3.

While the invention has been described in detail with respect to a certain embodiment thereof, it is understood that the applicant does not desire to limit his invention to the exact details illustrated and described except in so far as those details may be defined in the claims.

What is claimed is:

1. A system for locating faults in a cable having a metallic sheath covered by a layer of insulating material and buried in a conducting medium, said system comprising means for applying to the metallic sheath a composite signal containing a first component having a fundamental frequency and a second component having an even harmonic frequency of said first component, and fault detector means including:
    (a) means to detect signals along the cable at pairs of locations spaced longitudinally of the cable, which signals are representative of the differences in potentials at each of said pairs of locations due to the composite signal;
    (b) tuned circuit means connected to the signal detecting means to separate each detected signal into said first and second components;
    (c) means to convert the frequency of the separated first component to equal the frequency of the second component;
    (d) means for comparing the phase relationship between said converted frequency and the frequency of the separated second component;
    (e) and means responsive to a change in phase relationship to indicate the location of the fault.

2. A system as defined in claim 1 in which the even harmonic frequency is the second harmonic of the fundamental frequency.

3. A system as defined in claim 1 in which said means to detect signals along the cable is a pair of probes adapted to be inserted into the medium.

4. A system as claimed in claim 1 in which said fundamental frequency is sufficiently removed from local electric power and any harmonic thereof to preclude interference of said local frequency with detection of said signal.

5. A system as claimed in claim 4 wherein the local frequency is 60 c.p.s., the fundamental frequency is 83 c.p.s.

6. A system for locating faults in a cable having a metallic sheath covered by a layer of insulating material and buried in a conducting medium, said system comprising means for applying to the metallic sheath a composite signal containing a first component having a fundamental frequency and a second component having the second harmonic frequency of said first component, and fault detector means including:
    (a) two probes adapted to be inserted into the ground at pairs of locations spaced longitudinally of the cable to detect a signal representative of the differences in potentials at each of said pairs of location due to the composite signal;
    (b) a first and a second tuned amplifier connected in parallel across said probes, the first amplifier being tuned to the frequency of said first component, the second amplifier being tuned to the frequency of said second component;
    (c) a frequency doubler connected to the output of said first tuned amplifier to double the output frequency of said first amplifier;
    (d) a phase comparator adapted to compare the phase relationship between said doubled frequency and the frequency of said second amplifier;
    (e) and means responsive to a change in phase relationship to indicate the location of the fault.

7. A system as claimed in claim 6 in which the composite signal is generated by a generator comprising an oscillator for generating the fundamental frequency and a frequency doubler connected to said oscillator for generating said second harmonic frequency.

References Cited by the Examiner

UNITED STATES PATENTS

| | | | |
|---|---|---|---|
| 2,315,383 | 3/1943 | Andrews | 324—52 |
| 2,315,450 | 3/1943 | Nyquist | 324—52 |
| 2,598,290 | 5/1952 | O'Brien | 343—105 |
| 2,731,598 | 1/1956 | Herbert | 324—52 |
| 2,808,562 | 10/1957 | French et al. | 324—57 |
| 2,929,986 | 3/1960 | Mayes | 324—57 |
| 2,992,389 | 7/1961 | Gondouin | 324—7 |
| 3,155,897 | 11/1964 | Rice | 324—52 |

WALTER L. CARLSON, *Primary Examiner.*

G. R. STRECKER, *Assistant Examiner.*